Aug. 7, 1934.  G. E. FISHER  1,968,935
ROPE FASTENER
Filed Oct. 12, 1933
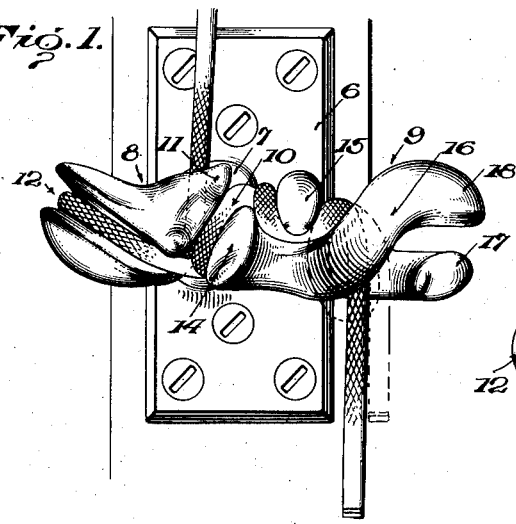
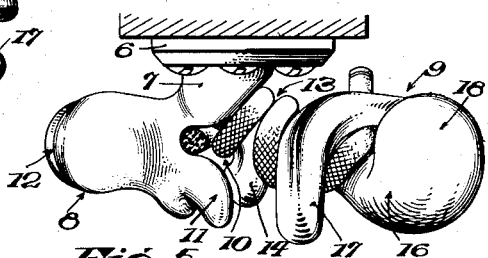
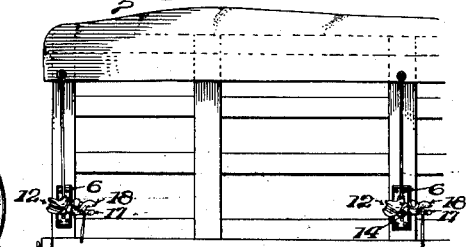
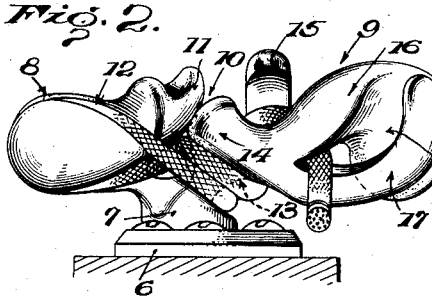
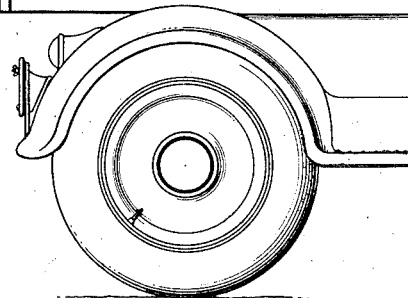
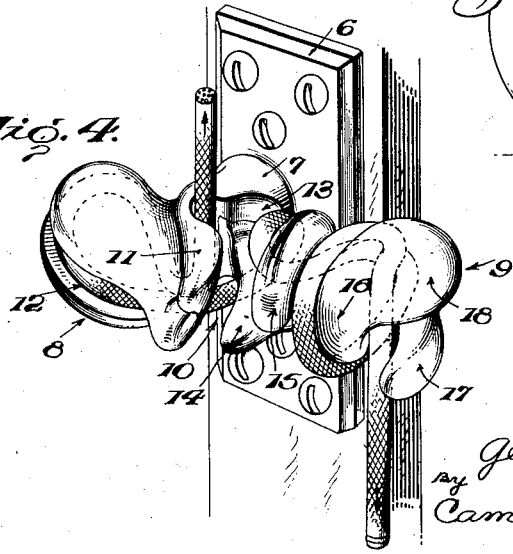
Inventor
George E. Fisher
By Cameron, Kerkam & Sutton
Attorneys Patented Aug. 7, 1934

1,968,935

UNITED STATES PATENT OFFICE 1,968,935

ROPE FASTENER

George E. Fisher, Bluefield, W. Va.

Application October 12, 1933, Serial No. 693,376

7 Claims. (Cl. 24—129)

This invention relates to devices for securing the ends of ropes, cables, and the like, and more particularly to devices of this general character to which such lines may be fastened without requiring the use of knots, hitches or mechanical locking means.

In line belaying devices of the types hitherto known it is generally necessary, in order to securely fasten the free end of the line, either to tie a knot or throw a hitch therein, or to utilize some mechanical locking means, all of which expedients render the line securing operation relatively difficult of performance and fail to leave the line clear for rapid releasing. Also, repeated use of such devices with the incident formation of knots and hitches or application of mechanical locking means tends to fray and weaken the line, and thereby shorten its period of usefulness. It is therefore one of the principal objects of the present invention to provide a fastening device of novel construction to which a rope or cable may be quickly and effectively secured with a minimum of effort and which will be free from the disadvantages of similar devices of the prior art.

Another object is to provide a rope fastener of unique construction to which a rope may be quickly and easily secured simply by taking turns about elements of the fastener without the tying of knots, the formation of hitches or the use of mechanical locking means.

A further object is to provide a new and improved cleat-like device for belaying a line which is formed with a multiplicity of grooves for receiving turns of the line and means for readily guiding and holding the line in said grooves during and after the securing operation.

Still another object is to provide a novel rope fastener which is so constructed as to place a minimum of strain upon the portion of the rope engaged therewith and to leave said rope readily releasable with a minimum of effort.

A still further object is to provide a novel line fastener which is relatively inexpensive of manufacture, easily installed, and suitable for a wide variety of uses.

These and other objects will appear more fully from a consideration of the detailed description of the embodiment of the invention which follows. Although but one form of the invention is described and illustrated in the accompanying drawing, it is to be expressly understood that this drawing is for the purpose of illustration only and is not to be construed as defining the scope of the invention, reference being had for this purpose to the appended claims.

Referring now to the drawing, wherein like reference characters indicate like parts throughout the several views:

Fig. 1 is a front elevation of a cleat-like rope fastener constituting one embodiment of the present invention and showing one manner in which a rope may be secured thereto when the fastener is mounted with its base in a vertical plane;

Fig. 2 is a bottom plan view of the embodiment of Fig. 1;

Fig. 3 is a top plan view of the embodiment of Fig. 1;

Fig. 4 is a perspective view of the embodiment of Fig. 1 showing a modified manner of securing the rope; and Fig. 5 is a view of a portion of an automobile truck illustrating one manner of utilizing the rope fastener of Figs. 1–4.

While the line or rope fastener of the present invention is adapted for a multiplicity of different uses, it is intended that one of its principal fields of utility will be as a means for securing or fastening the ends of ropes which are provided for holding tarpaulins or covers on trucks and the like. Truck covers and tarpaulins of this character, because of their conditions of use, must be capable of being securely fastened to the truck body with assurance that the fastening will not become loose during transit, and at the same time permit easy and frequent unfastening for the purpose of loading and unloading the contents of the truck which are protected by the covering. Because of the fact that the line fastener provided by the present invention is so constructed as to insure a secure fastening without likelihood of accidental loosening, and since this fastener requires no knots, hitches nor mechanical locking means, the fastening operation being performed by simply laying the free end of the rope to be secured in preformed grooves and around uniquely constructed hook-like anchoring members, it is especially well adapted for this use, and in Fig. 5 of the drawing is shown in a typical installation of this character.

Referring now more particularly to the details of the rope fastener illustrated, this particular embodiment consists essentially of a base plate 6, a center post or stem 7 which is secured to or formed integrally with base plate 6, and a pair of peculiarly formed arms indicated generally at 8 and 9, said arms being secured to and extending laterally from the stem 7. Base plate 6 may be provided with suitable bolt or screw holes for use in mounting the fastener in any desired location.

Each of arms 8 and 9 is provided with a portion which lies above the top of stem 7, these portions being separated by an opening or groove 10 of substantial depth which lies generally in a plane slightly inclined to the vertical and to the axis of stem 7. The bottom or rope receiving portion of groove 10 is slightly widened beyond said plane and defines the top of stem 7, substantially parallel to the plane of base plate 6. Arm 8 is provided with a suitable projecting lug or ear 11 which overlies the bottom portion of groove 10 and serves to guide and retain the rope therein.

Arm 8 is also provided in the surface thereof with a groove 12 which extends completely around said arm in a plane substantially at right angles to the plane of groove 10, said groove 12 starting and finishing at a point adjacent one end of the bottom portion of groove 10. Groove 12 is of suitable depth and width to accommodate a round turn of the rope to be secured.

In the corner which is formed by the junction of arm 9 and stem 7 another rope receiving groove 13 is formed extending from one end of the bottom portion of groove 10 around stem 7 and under arm 9 to the opposite end of said bottom portion, the groove thus formed being substantially U-shaped and lying in a plane which is substantially perpendicular to those of both groove 12 and groove 10. Groove 13 is preferably formed of a width sufficient to receive two turns of the rope lying side by side.

Arm 9 is provided with an upwardly projecting rope guiding lug or ear 14 adjacent the upper end of groove 10 and a plurality of interdigitated hook-like members 15, 16 and 17 with which the free end of the rope to be secured is adapted to be intertwined and finally anchored. Hook-like member 15 extends upwardly from arm 9 just above one end of groove 13 with its upper end slightly curved into a position substantially parallel to base plate 6. The plane of member 15 may thus be said to be perpendicular to base plate 6 and approximately perpendicular to the line of arms 8 and 9. Hook-like member 17 extends laterally from the bottom portion of arm 9 just beyond groove 13, parallel to the line of arms 8 and 9 and with its hooked end turned upwardly away from the plane of base plate 6. The plane of member 17 is substantially perpendicular to both the plane of base plate 6 and that of hook-like member 15. Member 16 is of irregular shape but occupies a position generally diagonal to and between the planes of members 15 and 17, starting from a point on arm 9 approximately above the inner end of member 17. The hooked end of member 16 is directed downwardly with respect to base plate 6 and is enlarged and flattened as indicated at 18 in a plane substantially parallel to that of member 17. The spaces which are formed around and between ear 14 and hook-like members 15, 16 and 17 provide a tortuous groove or passage which is adapted to receive the free end of the rope to be fastened and to finally anchor the same.

In using the rope fastener of the present invention to secure or belay a line, for example one of the ropes of a truck tarpaulin and cover, the portion of the rope closest to the standing part is first led into groove 10 and drawn tautly therethrough. A round turn is then taken about arm 8, the rope being laid in groove 12 and entering said groove in the portion formed on the underside of said arm. Leaving groove 12 the rope crosses and binds on the part leaving groove 10 and entering groove 12, and is then passed around groove 13 twice, the first round turn being completed by again passing the line through groove 10 and thereby again binding the portion of the rope lying therein. After the second turn is made in groove 13 the free end of the rope is led upwardly between ear 14 and hook-like member 15, passing under the hooked end of the latter, and thence downwardly and into the space between the flattened end 18 of member 16 and member 17. Finally, the free end is passed over the upwardly turned end of member 17 and drawn tightly down into the inner end of the space formed between the inner ends of members 16 and 17. For additional security, the free end may again be looped around members 16 and back over member 17, as is indicated in broken lines in Fig. 1. On the other hand, if extra security is not necessary or desired, as where a truck cover must be frequently removed, the second turn in groove 13 may be omitted, as is indicated in Fig. 4.

It will be understood that in the preceding description and in the claims, the terms "top", "above", "downwardly", "upwardly", etc., are used in a relative sense only, and are not intended to limit the invention to devices wherein the stem of the fastener is substantially vertical.

There is thus provided by the present invention a new and improved rope fastener of unique construction which is relatively inexpensive of manufacture, easy to use and highly efficient for the purpose intended. With this device a rope or other line may be securely fastened or belayed without tying knots or throwing hitches therein and without the use of any mechanical locking means. The line is adequately prevented from slipping by a plurality of turns about the fastener lying in different planes and binding at various points, while due to the novel formation of the fastener with rounded guiding surfaces and rope receiving grooves there is a minimum tendency to fray and weaken the rope even with often repeated fastening and unfastening operations.

Although, as a preferred embodiment, the rope fastener of the present invention has been described as used for securing the ropes of truck covers and the like, it is obvious that the fastener is susceptible of many other uses and may be made in a multiplicity of different sizes. For example, it might be used as a cleat for securing the mooring lines of boats, aircraft, and the like, in which event it would be mounted with the base plate in a horizontal position, for anchoring the halyards of large flags, and for many other purposes which will readily suggest themselves to those skilled in the art. While it has been found practical and desirable to make these fasteners of hot galvanized malleable iron, it is apparent that various other materials may be equally suitable dependent upon the intended usage of the device.

It is likewise obvious that the invention is not limited to the exact construction shown in the drawing but is capable of a variety of mechanical embodiments. For example, the exact shape of the various elements shown in the drawing may be modified without impairing their utility, and in the event that two turns of the rope in groove 13 are deemed unnecessary the shape and size of said groove may be modified accordingly. Also, although the fastener illustrated is provided with a flat base plate, it is apparent that this base may be replaced by a clamp, hook, ring, swivel, or any other desired means of securing the device in place dependent upon the conditions under which it is to be used. Various other changes, which will now appear to those skilled in the art may be made in the form, details of construction and arrangement of the parts without departing from the spirit of the invention, and reference is therefore to be had to the appended claims for a definition of the limits thereof.

What is claimed is:

1. A rope fastener comprising a stem, and a pair of arms secured to and extending laterally from said stem, said arms being separated by a groove of substantial depth extending upwardly from the upper end of said stem, one of said arms having a groove formed in the surface thereof and extending therearound in a plane intersecting the plane of said first named groove adjacent one end of the latter, the other of said arms comprising a plurality of interdigitated hook-like members with the spaces therebetween forming a tortuous groove.

2. A rope fastener comprising a base, a stem secured to said base, and a pair of arms secured to and extending laterally from said stem, said arms being separated by a groove of substantial depth extending upwardly from the upper end of said stem in a plane inclined to the axis thereof, one of said arms having a groove formed in the surface thereof and extending therearound in a plane substantially perpendicular to the plane of said first named groove, the other of said arms comprising a plurality of interdigitated hook-like members with the spaces therebetween forming a tortuous groove.

3. A rope fastener comprising a base, a stem secured to and projecting upwardly from said base, and a pair of arms secured to and extending laterally from said stem, said arms being separated by a groove of substantial depth extending upwardly from the upper end of said stem, one of said arms having a groove formed in the surface thereof and extending therearound in a plane intersecting the plane of said first named groove adjacent one end of the latter, the other of said arms comprising a plurality of interdigitated hook-like members with the spaces therebetween forming a tortuous groove, one of said members lying in a plane substantially perpendicular to that of said base and with its hooked end directed upwardly with respect to the latter, another member of like construction having its plane substantially perpendicular to that of said first named member, and a third member extending substantially diagonally between said first two named members and with its hooked end directed downwardly with respect to said base.

4. A rope fastener comprising a base, a stem secured to and projecting upwardly from said base, and a pair of arms secured to and extending laterally from said stem, said arms being separated by a groove of substantial depth extending upwardly from the upper end of said stem in a plane inclined to the axis of said stem, one of said arms having a groove formed in the surface thereof and extending therearound in a plane substantially perpendicular to the plane of said first named groove, the other of said arms comprising a plurality of interdigitated hook-like members with the spaces therebetween forming a tortuous groove, one of said members lying in a plane substantially perpendicular to that of said base and with its hooked end directed upwardly with respect to the latter, another member of like construction having its plane substantially perpendicular to that of said first named member, and a third member extending substantially diagonally between said first two named members and with its hooked end directed downwardly with respect to said base, the hooked end of said third member being enlarged and flattened in a plane substantially parallel to that of said first named member.

5. A rope fastener comprising a stem, and a pair of arms secured to and extending laterally from said stem, said arms being separated by a groove of substantial depth extending upwardly from the upper end of said stem, another groove formed in the corner provided by the junction of said stem and one of said arms, said groove lying in a plane passing through the bottom portion of said first named groove, the other of said arms having a groove formed in the surface thereof and extending therearound in a plane intersecting the planes of both said first and second named grooves at a point adjacent one end of the former, the first mentioned arm comprising a plurality of interdigitated hook-like members with the spaces therebetween forming a tortuous groove.

6. A rope fastener comprising a stem, and a pair of arms secured to and extending laterally from said stem, said arms having portions lying above the top of said stem and separated by a groove through the bottom portion of which is to be led the portion of the rope to be fastened closest to the standing part, one of said arms having a groove formed in the surface thereof and extending therearound in a plane intersecting the axis of the bottom portion of said first named groove and adapted to receive a round turn of said rope at it leaves said first named groove, another groove formed in the corner provided by the junction of said stem and the other of said arms to receive said rope after leaving said second named groove, the plane of said last named groove being substantially perpendicular to that of said second named groove, said other arm comprising a plurality of hook-like members with which the free end of said rope may be intertwined upon leaving said last named groove.

7. A rope fastener comprising a stem, a pair of arms secured to and extending laterally from said stem, said arms having portions lying above the top of said stem and separated by a groove through which is led the portion of the rope to be fastened closest to the standing part, one of said arms having a projecting portion overlying said groove and adapted to guide the rope thereinto, said arm also being provided with a groove formed in the surface thereof and extending therearound in a plane intersecting the axis of the bottom portion of said first named groove and adapted to receive a round turn of said rope as it leaves said first named groove, another groove formed in the corner provided by the junction of said stem and the other of said arms, said groove being of a width sufficient to receive two turns of said rope after leaving said second named groove, the plane of said turns being substantially perpendicular to that of said first named round turn, and a plurality of interdigitated hook-like members carried by said other arm with which the free end of said rope may be intertwined upon leaving said last named groove.

GEORGE E. FISHER.